United States Patent
Berger et al.

(10) Patent No.: US 10,572,304 B2
(45) Date of Patent: *Feb. 25, 2020

(54) DUAL/MULTI-MODE PROCESSOR PIPELINES SAMPLING

(71) Applicant: International Business Machines Corporation, Armonk, NY (US)

(72) Inventors: Deanna Postles Dunn Berger, Poughkeepsie, NY (US); Kathryn M. Jackson, Poughkeepsie, NY (US); Joshua D. Massover, Poughkeepsie, NY (US); Gary E. Strait, Poughkeepsie, NY (US); Hanno Ulrich, Tuebingen (DE); Craig R. Walters, Highland, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 730 days.

This patent is subject to a terminal disclaimer.

(21) Appl. No.: 14/501,190

(22) Filed: Sep. 30, 2014

(65) Prior Publication Data

US 2015/0261533 A1 Sep. 17, 2015

Related U.S. Application Data

(63) Continuation of application No. 14/208,257, filed on Mar. 13, 2014, now Pat. No. 10,176,013.

(51) Int. Cl.
*G06F 11/30* (2006.01)
*G06F 9/48* (2006.01)
*G06F 11/34* (2006.01)

(52) U.S. Cl.
CPC ............ *G06F 9/4881* (2013.01); *G06F 11/30* (2013.01); *G06F 11/3024* (2013.01);
(Continued)

(58) Field of Classification Search
CPC .......... G06F 11/34–3495; G06F 9/4881–4887; G06F 11/30–3096; G06F 11/3466–3495
See application file for complete search history.

(56) References Cited

U.S. PATENT DOCUMENTS 5,809,450 A * 9/1998 Chrysos ................. G06F 8/445
702/186
5,949,972 A * 9/1999 Applegate ........... G06F 11/3644
711/154

(Continued)

FOREIGN PATENT DOCUMENTS

EP 0919918 A2 2/1999

OTHER PUBLICATIONS ip.com (Disclosed Anonymously), "Measurement State Machine for Real Time Data Stream", An ip.com Prior Art Database Technical Disclosure, May 4, 2009, located at http://ip.com/IPCOM/000182629D, 14 pages.

(Continued)

*Primary Examiner* — Geoffrey R St Leger
*Assistant Examiner* — Joanne G Macasiano
(74) *Attorney, Agent, or Firm* — Cantor Colburn LLP; William Kinnaman

(57) ABSTRACT

Embodiments are directed to methodologies for efficiently sampling data for analysis by a pipeline analysis algorithm. The amount of sampled data is maximized without increasing sampling overhead by sampling "non-pipeline activity" data if the subject pipeline is inactive during the sampling time. The non-pipeline activity data is selected to include overall system information that is relevant to the subject pipeline's performance but is not necessarily dependent on whether the subject pipeline is active. In some embodiments, the non-pipeline activity data allows for confirmation of a pipeline performance characteristic that must otherwise be inferred by the subsequent pipeline analysis algorithm from (Continued)

data sampled while the pipeline was active. In some embodiments, the non-pipeline activity data allows the pipeline analysis algorithm to analyze additional performance characteristics that cannot otherwise be inferred from the data sampled while the pipeline was active.

12 Claims, 5 Drawing Sheets

(52) U.S. Cl.
CPC ........ *G06F 11/348* (2013.01); *G06F 11/3476* (2013.01); *G06F 11/3055* (2013.01); *G06F 11/3409* (2013.01)

(56) References Cited

U.S. PATENT DOCUMENTS

| | | | |
|---|---|---|---|
| 6,397,240 | B1 | 5/2002 | Fernando et al. |
| 6,539,502 | B1 * | 3/2003 | Davidson ............ G06F 11/3466 712/227 |
| 2006/0047987 | A1 | 3/2006 | Prabhakaran et al. |
| 2008/0031206 | A1 | 2/2008 | Sharma |

OTHER PUBLICATIONS ip.com, IBM, "Real-Time Sampling Point Adjustment", An IP.Com Prior Art Database Technical Disclosure, 2001, located at http://ip.com/IPCOM/000013760D; 3 pages.

Madanayake, HLP Arunja ., et al., "High-Frequency Systolic Broadband Beamforming Using Polyphase 3D IIR Frequency-Planar Digital Filters with Interleaved A/D Sampling", IEEE International Symposium on Circuits and Systems (ISCAS), 2009, pp. 329-332.

Thomson, Kyle E. et al., "A Scalable Architecture for Streaming Neural Information from Implantable Multichannel Neuroprosthetic Devices", IEEE International Symposium on Circuits and Systems (ISCAS), 2005, pp. 1342-1345.

Conte, Thomas M., Mary Ann Hirsch, and Kishore N. Menezes. "Reducing state loss for effective trace sampling of superscalar processors." Computer Design: VLSI in Computers and Processors, 1996. ICCD'96. Proceedings., 1996 IEEE International Conference on. IEEE (10 pages).

Dean, Jeffrey, et al. "ProfileMe: Hardware support for instruction-level profiling on out-of-order processors." Proceedings of the 30th annual ACM/IEEE international symposium on Microarchitecture. 1997. IEEE Computer Society. (12 pages).

* cited by examiner

DUAL/MULTI-MODE PROCESSOR PIPELINES SAMPLING

CLAIM OF PRIORITY UNDER 35 U.S.C. § 120

The present application is a continuation of U.S. patent application Ser. No. 14/208,257, titled "DUAL/MULTI-MODE PROCESSOR PIPLELINE SAMPLING," filed Mar. 13, 2014, now issued as U.S. Pat. No. 10,176,013.

BACKGROUND

The present disclosure relates generally to computer processor operation, and more specifically to improving the efficiency of processor pipeline sampling.

In computer processor applications, a "pipeline" or "pipe" is a set of data processing elements connected in series, wherein the output of one element in the series is the input of the next element in the series. In a contemporary pipeline sampler, information/data about the activity within a processor pipeline is sampled/collected at periodic, predetermined intervals, and the information is recorded for later processing. Sampling is typically initiated by a sampling pulse. To conserve processor resources, the data collection or sampling time of an individual sampling pulse, as well as the intervals between sampling pulses, are typically kept within set limits.

The sampled pipeline activity information is provided to a pipeline analysis algorithm for analysis of the pipeline's performance. In its simplest form, a contemporary pipeline analysis algorithm can utilize just a few bits of sampled information to derive basic pipeline performance characteristics such as cache pipeline utilization. More advanced contemporary pipeline analysis algorithms can use sampled information to derive broader pipeline performance characteristics such as request rates for individual fetch types and detailed information about system contention and pipeline recycle rates, thereby providing insight into how a given workload's behavior intersects with the system under test.

The usable sampled pipeline data occurs when the pipeline is active. If the pipeline is idle during sampling, substantially all of the sampled data fields will be inherently zero or inactive. Accordingly, only a subset of the available sampling time generates usable information for the pipeline analysis algorithm.

BRIEF SUMMARY

Embodiments are directed to a computer program product for providing samples of data of a pipeline. The computer program product includes a computer readable storage medium having program instructions embodied therewith, wherein the computer readable storage medium is not a signal, the program instructions readable by a processing circuit to cause the processing circuit to perform a method. The method includes, based on a processor pipeline circuit actively executing pipeline operations, providing, by a sampling circuit communicatively coupled to the pipeline circuit, sampled data of a sampled stage of the pipeline. The method further includes, based on the processor pipeline circuit not actively executing pipeline operations, providing, by the sampling circuit, sampled data other than sampled pipeline data.

Embodiments are directed to a computer implemented method for providing samples of data of a pipeline. The method includes, based on a processor pipeline circuit actively executing pipeline operations, providing, by a sampling circuit communicatively coupled to the pipeline circuit, sampled data of a sampled stage of the pipeline. The method further includes, based on the processor pipeline circuit not actively executing pipeline operations, providing, by the sampling circuit, sampled data other than sampled pipeline data.

Additional features and advantages are realized through the techniques described herein. Other embodiments and aspects are described in detail herein. For a better understanding, refer to the description and to the drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

Figure 1:
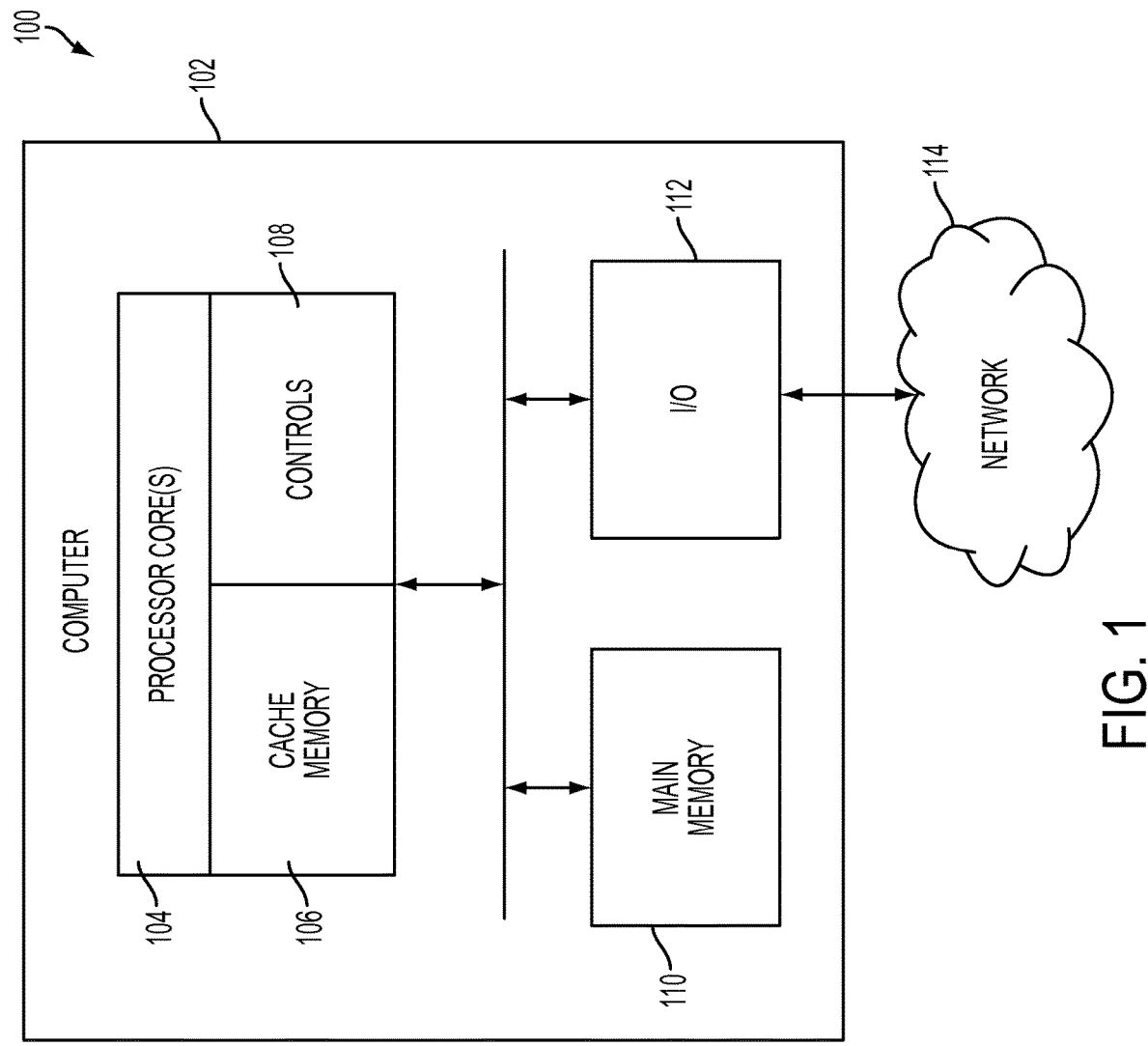
FIG. 1 depicts a block diagram illustrating an example of a computer system in accordance with one or more embodiments.

In the accompanying figures and following detailed description of the disclosed embodiments, the various elements illustrated in the figures are provided with three digit reference numbers. The leftmost digit of each reference number corresponds to the figure in which its element is first illustrated.

DETAILED DESCRIPTION

The present disclosure and exemplary embodiments described herein provide methods, systems, and computer program products for efficiently sampling pipeline data for later analysis by a pipeline analysis algorithm. In accordance with the disclosed exemplary embodiments, pipeline sampling systems and methodologies are provided that maximize the data gathered during a given sampling time. Under contemporary pipeline sampling techniques the bulk of sampled data occurs when the pipeline is active. Thus, if the pipeline is idle during sampling, the relevant data fields will be inherently zero or inactive. Accordingly, under contemporary pipeline sampling only a subset of the available sampling time generates usable data for the downstream pipeline analysis algorithm. Instead of devoting sampling time to gathering empty data fields that will in effect be discarded later by the pipeline analysis algorithm, the disclosed exemplary embodiments improve sampling efficiency by providing an alternative sampling mode that gathers alternative data if the pipeline is in fact idle during sampling time. In the alternative sampling mode, the alternative data to be gathered is selected to include overall system information that is relevant to pipeline performance but not dependent on whether the pipeline is active. In some embodiments, the alternative data allows for confirmation of a system performance characteristic that is otherwise inferred by the subsequent pipeline analysis algorithm using the data sampled while the pipeline was active. In some embodiments, the alternative data allows the subsequent pipeline analysis algorithm to analyze additional performance characteristics that cannot be inferred from the data sampled while the pipeline was active. Later in this disclosure, the above-described alternative data is referred to as "secondary observation points" and/or "non-pipeline activity." Thus, for a given sampling pulse/time, the exemplary embodiments of the present disclosure provide dual or multi-mode sampling systems, structure and methodologies that increase the amount of sampled data and improve sampling efficiency, all without increasing front-end processor sampling overhead or placing additional requirements on system storage or memory.

It is noted that various connections are set forth between elements in the present disclosure and in the drawings. These connections, unless specified otherwise, may be direct or indirect, and the present disclosure is not intended to be limiting in this respect. Accordingly, a coupling of entities may refer to either a direct or an indirect connection.

In some embodiments, various functions or acts may take place at a given location and/or in connection with the operation of one or more apparatuses or systems. In some embodiments, a portion of a given function or act may be performed at a first device or location, and the remainder of the function or act may be performed at one or more additional devices or locations.

The diagrams depicted herein are illustrative. There may be many variations to the diagram or the operations described therein without departing from the spirit of the disclosure. For instance, the actions may be performed in a differing order or actions may be added, deleted or modified. Also, the term "coupled" describes having a signal path between two elements and does not imply a direct connection between the elements with no intervening elements/connections. All of these variations are considered a part of the present disclosure.

Turning now to the drawings in greater detail, wherein like reference numerals indicate like elements, FIG. 1 illustrates an example of a computer system 100 including an exemplary computing device ("computer") 102 configured for pipeline sampling in accordance with the present disclosure. In addition to computer 102, exemplary computer system 100 includes network 114, which connects computer 102 to additional systems (not depicted) and may include one or more wide area networks (WANs) and/or local area networks (LANs) such as the Internet, intranet(s), and/or wireless communication network(s). Computer 102 and additional system are in communication via network 114, e.g., to communicate data between them.

Exemplary computer 102 includes processor cores 104, main memory ("memory") 110, and input/output component(s) 112, which are in communication via bus 103. Processor cores 104 includes cache memory ("cache") 106 and controls 108, which include components configured for pipeline sampling, which will be described in more detail below. Cache 106 may include multiple cache levels (not depicted) that are on or off-chip from processor 104. Memory 110 may include various data stored therein, e.g., instructions, software, routines, etc., which, e.g., may be transferred to/from cache 106 by controls 108 for execution by processor 104. Input/output component(s) 112 may include one or more components that facilitate local and/or remote input/output operations to/from computer 102, such as a display, keyboard, modem, network adapter, etc. (not depicted).

Figure 2:
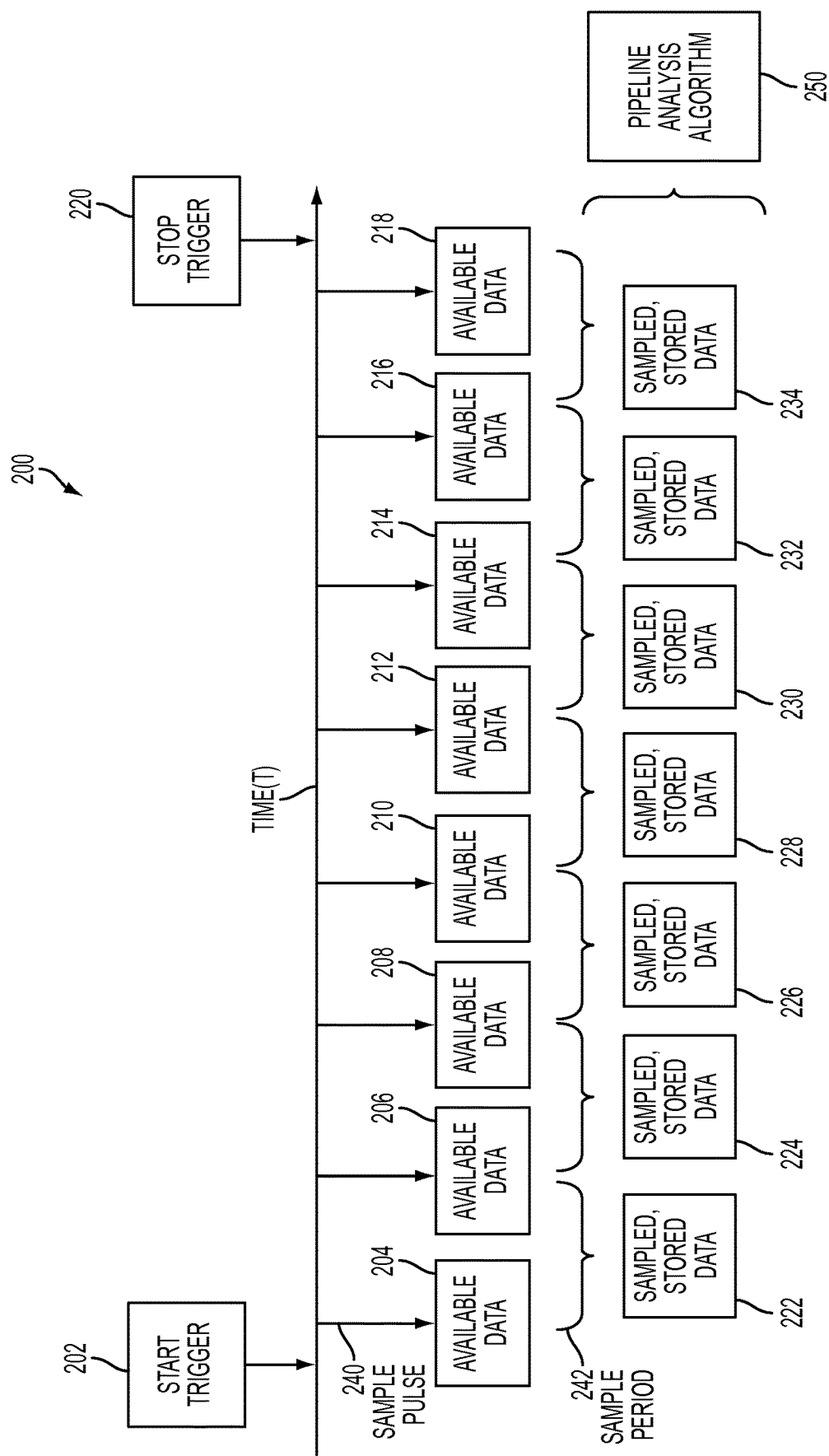
FIG. 2 depicts a block diagram illustrating an example of pipeline sampling in accordance with one or more embodiments.

FIG. 2 depicts a block diagram illustrating an example of a pipeline sampling configuration 200 in accordance with one or more embodiments of the present disclosure. As shown, pipeline sampling configuration 200 is commenced at a start trigger 202 and ends at a stop trigger 220. Time is represented by the horizontal line (t), and a plurality of periodic sample pulses 240 initiate sampling from available data 204, 206, 208, 210, 212, 214, 216, 218 within a predetermined sampling time. For ease of illustration, only one sample pulse 240 of the eight sample pulses shown in FIG. 2 is labeled. Sample period 242 represents the time between sample pulses 240. Sampled, stored data 222, 224, 226, 228, 230, 232, 234 represents the data sampled and stored from among available data 204, 206, 208, 210, 212, 214, 216, 218. Sampled, stored data 222, 224, 226, 228, 230, 232, 234 is then provided to a downstream pipeline analysis algorithm 250, which uses the aggregate sampled, stored data to derive performance characteristics of the subject pipeline.

Continuing with FIG. 2, under the present disclosure the efficiency with which available data 204, 206, 208, 210, 212, 214, 216, 218 is sampled is increased without increasing the sampling time. As described later in connection with FIGS. 3 and 4, instead of devoting sampling time to gathering empty data fields that will in effect be discarded later by pipeline analysis algorithm 250, the disclosed exemplary embodiments improve sampling efficiency by providing an alternative or additional sampling mode that gathers alternative data if the subject pipeline is in fact idle during the sampling time of each sample pulse 240. The alternative data sampled under the disclosed exemplary embodiments are selected to include system information that is relevant to overall pipeline performance but not dependent on whether the subject pipeline is active. Thus, as will be described in more detail below, sampled, stored data 204, 206, 208, 210, 212, 214, 216, 218 each includes data fields (322, 324, 326, 328, 330, 332, 342, 344, 346, 348, 350, all depicted in FIG. 3) sampled according to the dual mode or multi mode sampling methodology shown in FIGS. 3 and 4.

Figure 3:
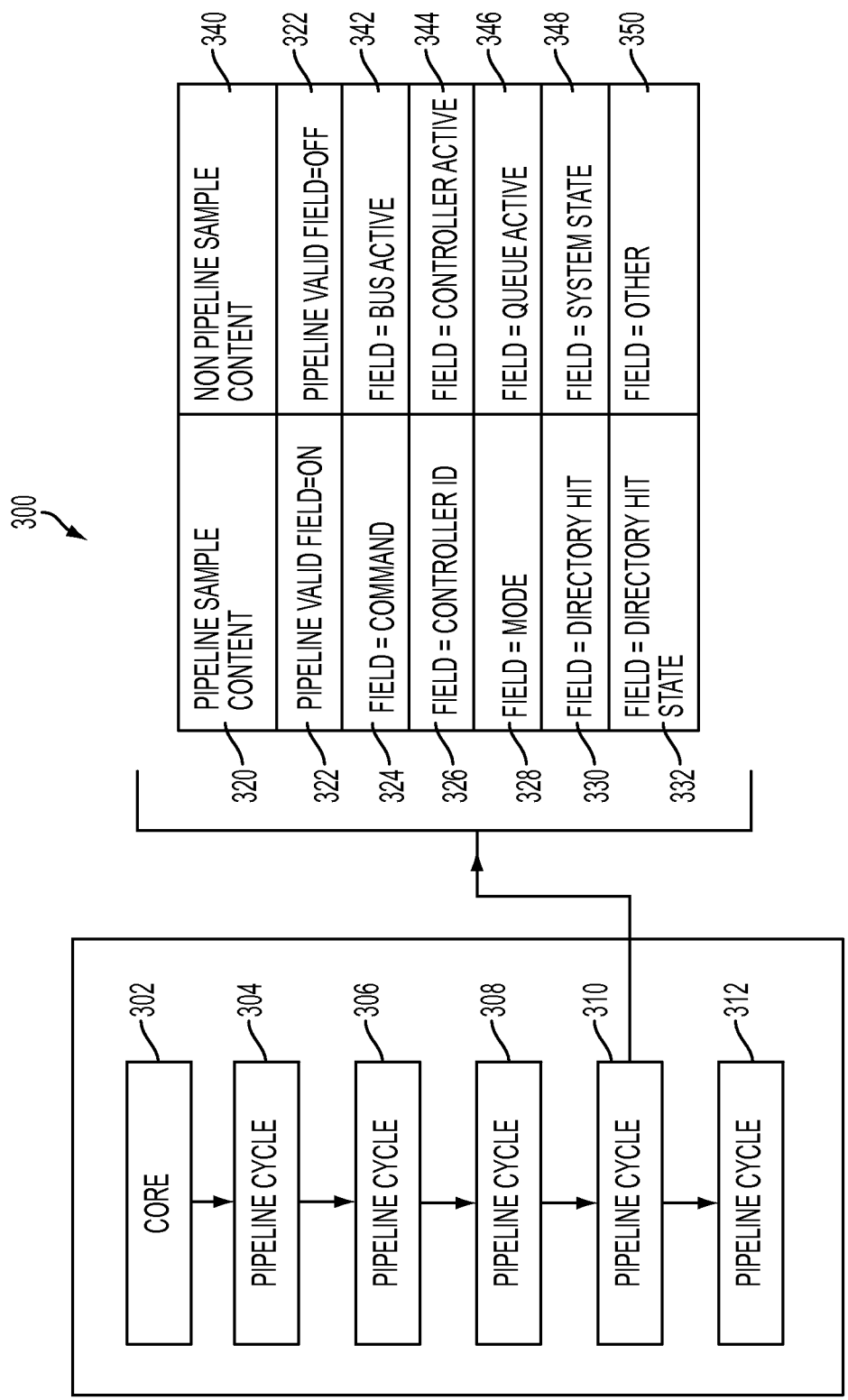
FIG. 3 depicts a block diagram illustrating an example of a system pipeline in accordance with one or more embodiments.

FIG. 3 illustrates an example of a processor pipeline subsystem 300 of exemplary computer 102. More specifically, pipeline subsystem 300 may be incorporated within controls 108 of computer 102. Pipeline subsystem 300 includes a core 302 in "communication" (e.g., via one or more buses, circuits, connections, etc.) with pipeline (or "pipe") cycle 304, pipeline cycle 306, pipeline cycle 308, pipeline cycle 310 and pipeline cycle 312. In computer processor applications, each pipeline cycle 304, 306, 308, 310, 312 includes a series of related data processing elements (not depicted) connected in series, wherein the output of one element in the series is the input of the next element in the series.

FIG. 3 further illustrates for pipeline cycle 310 how the pipeline activity for a given cycle may be sampled and stored at periodic, predetermined intervals in accordance with the present disclosure. As noted previously, data fields 322, 324, 326, 328, 330, 332, 342, 344, 346, 348, 350 correspond to each sampled, stored data block 204, 206, 208, 210, 212, 214, 216, 218 depicted in FIG. 2. In order to conserve processor resources, the sampling initiated by sample pulse 240 (depicted in FIG. 2) is completed within a predetermined sample time. The present disclosure provides dual or multi-mode sampling in that one set of data fields (324, 326, 328, 330, 332) is gathered when the pipeline is active, and another set of data fields (322, 342, 344, 346, 348, 350) is gathered when the pipeline is inactive, all while not increasing sampling time beyond the time required to gather the one set of data fields (e.g., 324, 326, 328, 330, 332) or increasing the overall system storage or memory requirements. Thus, under one or more exemplary embodiments, alternative data is gathered, and the efficiency and performance of downstream pipeline analysis improved, all within the same sample time that would be required to gather the one set of data fields (324, 326, 328, 330, 332).

Continuing with FIG. 3, during the sampling time of sample pulse 240 (depicted in FIG. 2), pipeline cycle 310 will either be active or inactive, as indicated by the ON/OFF status of pipeline valid field 322. If pipeline cycle 310 is active, pipeline valid field 322 will be ON, and fields 322, 324, 326, 328, 330 and 332 will be sampled and stored during the sampling time of sample pulse 240 (depicted in FIG. 2). If pipeline cycle 310 is inactive, pipeline valid field 322 will be OFF, and fields 322, 342, 344, 346, 348, 350 will be sampled and stored during the sampling time of sample pulse 240 (depicted in FIG. 2).

Fields 324, 326, 328, 330 and 332 are selected from a variety of options such that the downstream pipeline analysis algorithm 250 (shown in FIG. 2) may derive information about various performance characteristics of pipeline cycle 310, such as cache pipeline utilization, request rates for individual fetch types and detailed information about system contention and pipeline recycle rates. Fields 342, 344, 346, 348 and 350 are also selected from a variety of options such that the downstream pipeline analysis algorithm 250 (shown in FIG. 2) may derive information about various performance characteristics of pipeline cycle 310 in greater detail or derive information about various system performance characteristics not directly observable from the pipeline behavior. Fields 342, 344, 346, 348 and 350 are different from fields 324, 326, 328, 330 and 332 in that fields 342, 344, 346, 348 and 350 gather information about aspects of the overall system that are relevant to the system 100 but do not depend on pipeline 310 being active. Thus, any aspect of the overall system outside of pipeline 310 may be analyzed as long as the selected overall system aspect is capable of being analyzed to yield performance characteristics. In some instances, the overall system aspect selected for sampling allows for confirmation of a pipeline performance characteristic that would otherwise have to be inferred by the subsequent sampling algorithm 250 (depicted in FIG. 2) using the data sampled while pipeline 310 was active, although in this approach a more accurate result is produced via direct observation as opposed to inference. In some instances, the overall system aspect selected for sampling allows the subsequent sampling algorithm 250 (depicted in FIG. 2) to analyze additional performance characteristics that cannot be inferred from the data sampled while pipeline 310 was active. In the example of FIG. 3, the fields sampled when pipeline valid field 322 is sampled as ON include a COMMAND field 324, a CONTROLLER ID field 326, a MODE field 328, a DIRECTORY HIT field 330 and a DIRECTORY HIT SATE field 332. Also in example of FIG. 3, the fields sampled when pipeline valid field 322 is sampled as OFF include a BUS ACTIVE field 342, a CONTROLLER ACTIVE field 344, a QUEUE ACTIVE field 346, a SYSTEM STATE field 348 and an "OTHER" field 350.

Figure 4:
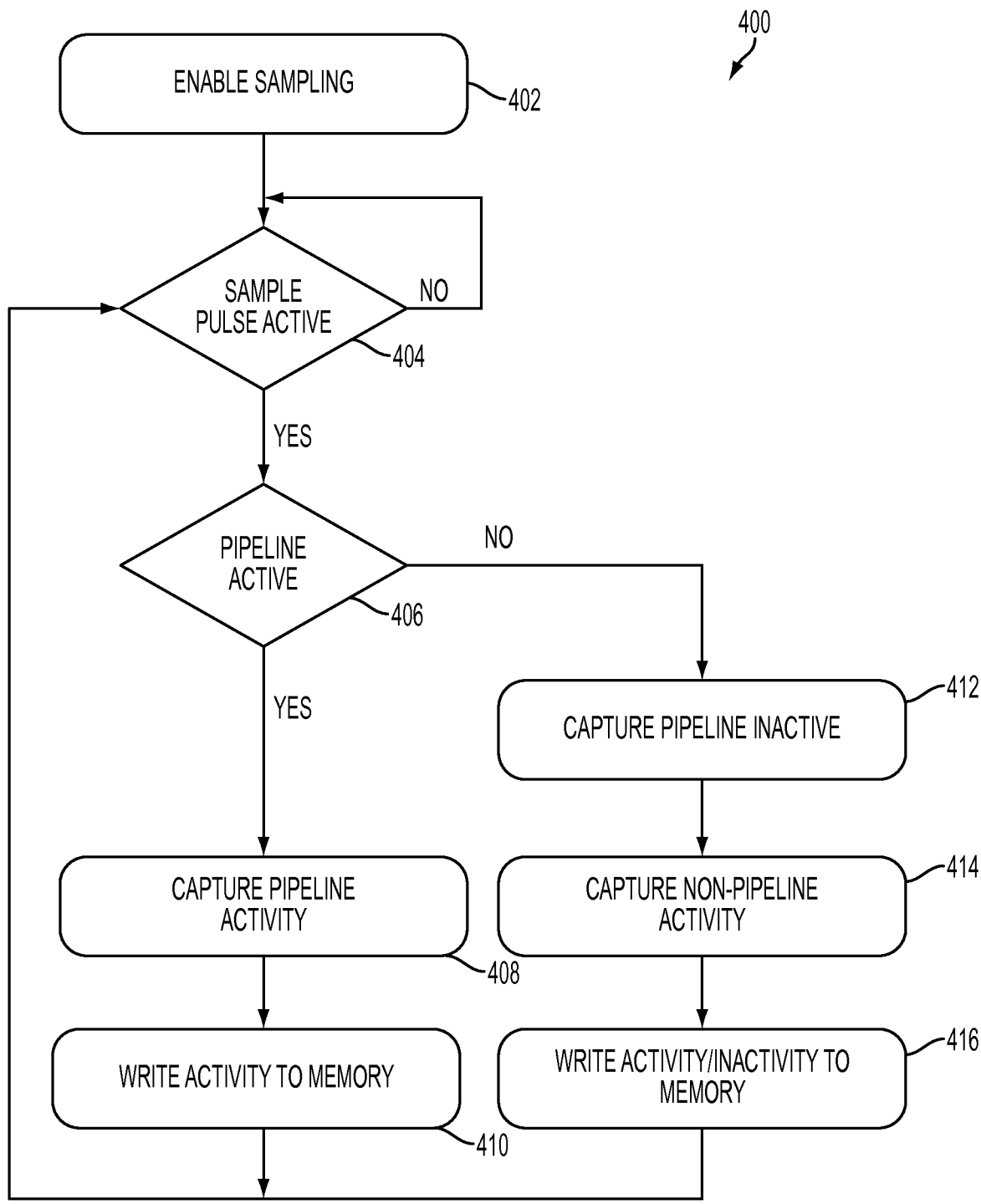
FIG. 4 depicts a flow diagram illustrating an example of a sampling methodology in accordance with one or more embodiments.

FIG. 4 illustrates a methodology 400 of one or more embodiments of the present disclosure. More specifically methodology 400 is one example of a sampling algorithm of the present disclosure. As shown, methodology 400 begins at block 402, which enables sampling. Decision block 404 determines whether a sample pulse is active. If the result of the inquiry at decision block 404 is no, methodology 400 returns to an input of decision block 404 and continues looking for a sample pulse. If the result of the inquiry at decision block 404 is yes, methodology 400 proceeds to the inquiry at decision block 406 to determine whether the subject pipeline is active.

From decision block 406, methodology 400 can branch into one or another sampling mode. If the result of the inquiry at decision block 406 is yes, the subject pipeline is active and methodology 400 proceeds to blocks 408 and 410 to capture the pipeline activity data (i.e., primary observation point(s)) and write the captured pipeline activity data to memory. Methodology 400 returns to an input of decision block 404 and looks for a next sample pulse. If the result of the inquiry at decision block 406 is no, the subject pipeline is inactive, and methodology 400 proceeds to block 412 and captures that the subject pipeline is inactive without sampling all of the relevant pipeline fields. It is assumed in block 412 that when pipeline valid field 322 (depicted in FIG. 3) is OFF, all of fields 324, 326, 328, 330, 332 will be OFF or INACTIVE or subsequently discarded by the pipeline analysis algorithm 250. Thus, instead of devoting sampling time or storage/memory space to gathering empty fields, methodology 400 at block 412 simply captures that the subject pipeline is inactive and moves to block 414 to capture non-pipeline activity (i.e., secondary observation points(s)), which corresponds to fields 342, 344, 346, 348, 350 depicted in FIG. 3. This is in contrast to contemporary sampling methodologies that would still capture fields 324,326,328, 330,332 when pipeline valid field, 322, is inactive.

The non-pipeline activity of block 414 may be selected from a variety of options such that the downstream pipeline analysis algorithm (250, depicted in FIG. 2) may use the non-pipeline activity to derive information about various performance characteristics of the subject pipeline or system. Non-pipeline activity is different from pipeline activity in that non-pipeline activity is gathered from information about aspects of the system that do not depend on the subject pipeline being active. Thus, any aspect of the overall system outside of the subject pipeline may be analyzed as long as the selected overall system aspect is capable of being analyzed to yield performance characteristics of the subject pipeline or system. In some instances, the overall system aspect selected for sampling allows for confirmation of a pipeline performance characteristic that would otherwise have to be inferred by the subsequent sampling algorithm (250, depicted in FIG. 2) using the data sampled while the subject pipeline was active (block 408). In some instances, the overall system aspect selected for sampling allows the subsequent sampling algorithm (250, depicted in FIG. 2) to analyze additional performance characteristics that cannot be inferred from the data sampled while the subject pipeline was active. Block 416 writes the captured activity (block 414) and inactivity (block 412) to memory, and methodology 400 returns to an input of decision block 404 and looks for a next sample pulse.

Technical effects and benefits of one or more embodiments described herein include efficiently sampling pipeline data for later analysis by a pipeline analysis algorithm. In accordance with one or more embodiments, pipeline sampling systems and methodologies are provided that maximize the data gathered during a given sampling time. Under contemporary pipeline sampling techniques the bulk of sampled data occurs when the pipeline is active. Thus, if the pipeline is idle during sampling, the relevant data fields will be inherently zero or inactive. Accordingly, under contemporary pipeline sampling only a subset of the available sampling time generates usable data for the downstream pipeline analysis algorithm. Instead of devoting sampling time to gathering empty data fields that will in effect be discarded later by the pipeline analysis algorithm, the disclosed exemplary embodiments improve sampling efficiency by providing an alternative sampling mode that gathers alternative data if the pipeline is in fact idle during sampling time. In the alternative sampling mode, the alternative data to be gathered is selected to include overall system information that is relevant to pipeline performance but not dependent on whether the pipeline is active. In some embodiments, the alternative data allows for confirmation of a system performance characteristic that is otherwise inferred by the subsequent pipeline analysis algorithm using the data sampled while the pipeline was active. In some embodiments, the alternative data allows the subsequent pipeline analysis algorithm to analyze additional performance characteristics that cannot be inferred from the data sampled while the pipeline was active. The above-described alternative data includes "sampled data other than sampled pipeline data," which may also be described as "secondary observation points" and/or "non-pipeline activity." Thus, for a given sampling pulse/time, the exemplary embodiments of the present disclosure provide dual or multi-mode sampling systems, structure and methodologies that increase the amount of sampled data and improve sampling efficiency, all without increasing front-end processor sampling overhead or placing additional requirements on system storage or memory.

Accordingly, an embodiment of the present disclosure can provide a pipeline apparatus for providing samples of data of a pipeline. The pipeline apparatus includes a processor pipeline circuit for pipeline execution of a process, and a sampling circuit communicatively coupled to the processor pipeline circuit. The pipeline apparatus is configured to perform a method that includes, based on the processor pipeline circuit actively executing pipeline operations, providing, by the sampling circuit, sampled data of a sampled stage of the pipeline. The method further includes, based on the processor pipeline circuit not actively executing pipeline operations, providing, by the sampling circuit, sampled data other than sampled pipeline data.

In addition to one or more of the features described above, or as an alternative, further embodiments can include the method performed by the pipeline apparatus including storing the sampled data other than sampled pipeline data. Further embodiments can also include the method performed by the pipeline apparatus further including providing the stored sampled data other than sampled pipeline data to an algorithm, which uses the sampled data other than sampled pipeline data to derive at least one performance characteristic of the pipeline. Further embodiments may also include the method performed by the pipeline apparatus further including providing the stored sampled data to the algorithm, which uses the sampled data to derive at least one additional performance characteristic of the pipeline. Further embodiments can also include the at least one performance characteristic not capable of being inferred from the sampled data. Further embodiments can include the at least one performance characteristic capable of being inferred from the sampled data. Further embodiments can include the sampled stage including a series of periodic predetermined sampling times. Further embodiments can include the providing, by the sampling circuit, of the sampled data other than sampled pipeline data occurs within the predetermined sampling times.

An embodiment of the present disclosure can further provide a computer program product for providing samples of data of a pipeline. The computer program product includes a computer readable storage medium having program instructions embodied therewith, wherein the computer readable storage medium is not a signal, the program instructions readable by a processing circuit to cause the processing circuit to perform a method. The method includes, based on a processor pipeline circuit actively executing pipeline operations, providing, by a sampling circuit communicatively coupled to the pipeline circuit, sampled data of a sampled stage of the pipeline. The method further includes, based on the processor pipeline circuit not actively executing pipeline operations, providing, by the sampling circuit, sampled data other than sampled pipeline data.

In addition to one or more of the features described above, or as an alternative, further embodiments of the computer program product can include the method performed by the processing circuit further including storing the sampled data other than sampled pipeline data. Further embodiments can also include the method performed by the processing circuit further including providing the stored sampled data other than sampled pipeline data to an algorithm, which uses the sampled data other than sampled pipeline data to derive at least one performance characteristic of the pipeline. Further embodiments can also include the at least one performance characteristic not capable of being inferred from the sampled data. Further embodiments can also include the at least one performance characteristic capable of being inferred from the sampled data. Further embodiments can also include the sampled stage including a series of periodic predetermined sampling times, and the providing, by the sampling circuit, the sampled data other than sampled pipeline data occurs within the predetermined sampling times.

An embodiment of the present invention can further provide a computer implemented method for providing samples of data of a pipeline. The method includes, based on a processor pipeline circuit actively executing pipeline operations, providing, by a sampling circuit communicatively coupled to the pipeline circuit, sampled data of a sampled stage of the pipeline. The method further includes, based on the processor pipeline circuit not actively executing pipeline operations, providing, by the sampling circuit, sampled data other than sampled pipeline data.

In addition to one or more of the features described above, or as an alternative, further embodiments of the computer implemented method can include storing the sampled data other than sampled pipeline data. Further embodiments can include providing the stored sampled data other than sampled pipeline data to an algorithm, which uses the sampled data other than sampled pipeline data to derive at least one performance characteristic of the pipeline. Further embodiments can include the at least one performance characteristic not being inferred from the sampled data. Further embodiments can include the at least one performance characteristic capable of being inferred from the sampled data. Further embodiments can include the sampled stage including a series of periodic predetermined sampling times, and the providing, by the sampling circuit, the sampled data other than sampled pipeline data occurs within the predetermined sampling times.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 5:
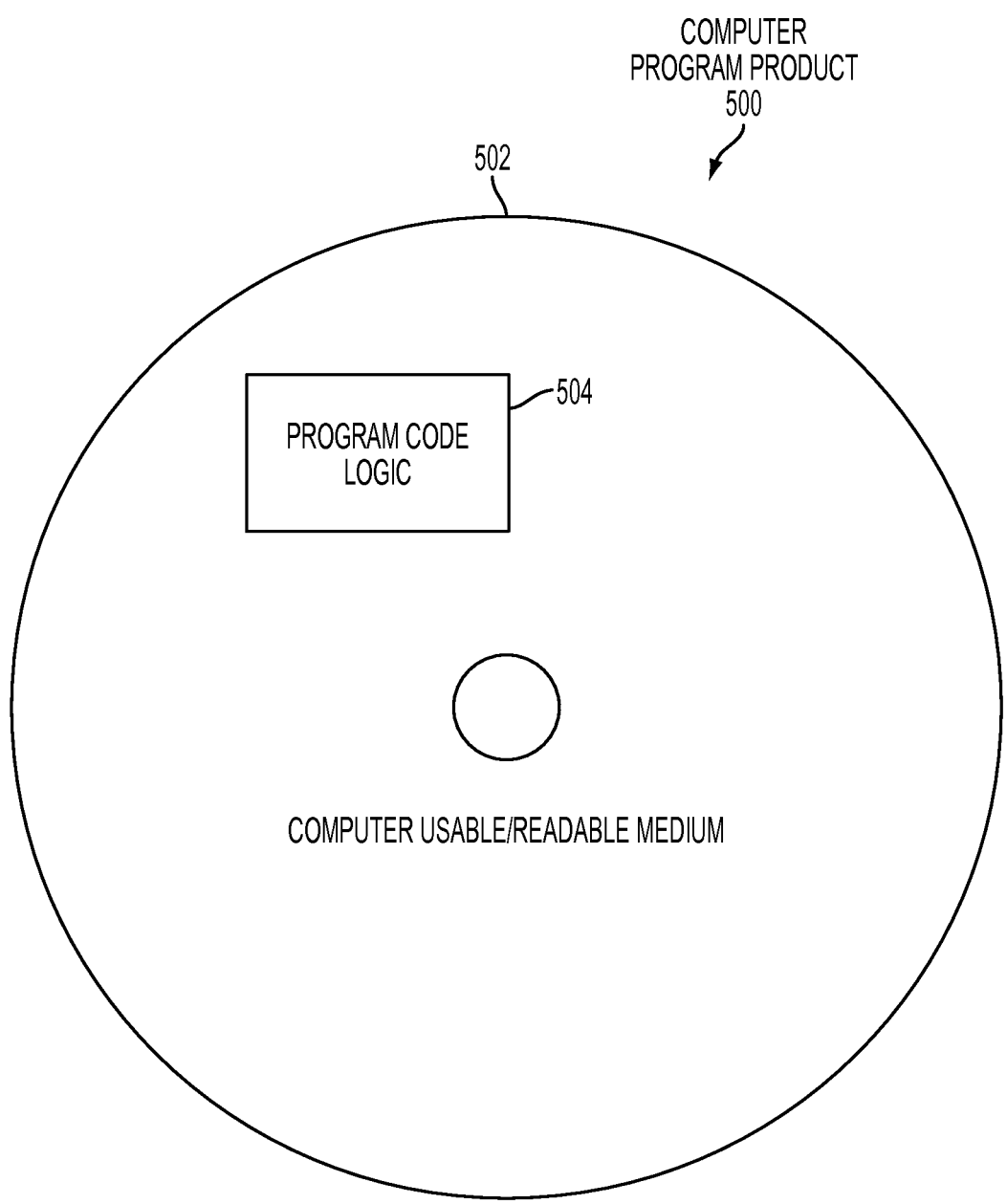
FIG. 5 depicts a computer-readable medium in accordance with one or more embodiments.

Referring now to FIG. 5, a computer program product 500 in accordance with an embodiment that includes a computer readable storage medium 502 and program instructions 504 is generally shown.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for providing samples of data of a pipeline, the computer program product comprising:
   a non-transitory computer readable storage medium having program instructions embodied therewith, wherein the computer readable storage medium is not a signal, the program instructions readable by a processing circuit to cause the processing circuit to perform a method comprising:
   making a determination that a processor pipeline circuit is or is not actively executing pipeline operations, wherein making the determination that the processor pipeline circuit is or is not actively executing pipeline operations comprises reading a pipeline valid data field of the pipeline data moving through the processor pipeline circuit;
   based at least in part on the determination that the processor pipeline circuit is actively executing pipeline operations, executing a first sampling mode comprising providing, by a sampling circuit communicatively coupled to said pipeline circuit, sampled pipeline data of a sampled stage of the pipeline;
   wherein the sampled pipeline data comprises portions of the pipeline data, other than the pipeline valid data field, moving through the processor pipeline circuit;
   wherein the sampled pipeline data is sampled from at least one first source of sampled pipeline data; and
   based at least in part on the determination that said processor pipeline circuit is not actively executing pipeline operations, executing a second sampling mode comprising providing, by said sampling circuit, sampled data other than sampled pipeline data;
   wherein the sampled data other than sampled pipeline data is relevant to the processor pipeline circuit's performance but is not dependent on whether the processor pipeline circuit is actively executing pipeline operations;
   wherein the sampled data other than sampled pipeline data is sampled from at least one second source of sampled data other than sampled pipeline data;
   wherein the at least one first source is different than the at least one second source.

2. The computer program product of claim 1, wherein the method performed by said processing circuit further comprises:
   storing said sampled data other than sampled pipeline data.

3. The computer program product of claim 2, wherein the method performed by said processing circuit further comprises:
   providing said stored sampled data other than sampled pipeline data to an algorithm, which uses said sampled data other than sampled pipeline data to derive at least one performance characteristic of the pipeline.

4. The computer program product of claim 3 wherein said at least one performance characteristic cannot be inferred from said sampled pipeline data.

5. The computer program product of claim 3 wherein said at least one performance characteristic can be inferred from said sampled pipeline data.

6. The computer program product of claim 1 wherein:
   said sampled stage comprises a series of periodic predetermined sampling times; and
   said providing, by said sampling circuit, said sampled data other than sampled pipeline data occurs within said predetermined sampling times.

7. A computer implemented method for providing samples of data of a pipeline, the computer implemented method comprising:
   making a determination that a processor pipeline circuit is or is not actively executing pipeline operations, wherein making the determination that the processor pipeline circuit is or is not actively executing pipeline operations comprises reading a pipeline valid data field of the pipeline data moving through the processor pipeline circuit;
   based at least in part on the determination that the processor pipeline circuit is actively executing pipeline operations, executing a first sampling mode comprising providing, by a sampling circuit communicatively coupled to said pipeline circuit, sampled pipeline data of a sampled stage of the pipeline;
   wherein the sampled pipeline data comprises portions of the pipeline data, other than the pipeline valid data field, moving through the processor pipeline circuit;
   wherein the sampled pipeline data is sampled from at least one first source of sampled pipeline data; and
   based at least in part on the determination that said processor pipeline circuit is not actively executing pipeline operations, executing a second sampling mode comprising providing, by said sampling circuit, sampled data other than sampled pipeline data;
   wherein the sampled data other than sampled pipeline data is relevant to the processor pipeline circuit's performance but is not dependent on whether the processor pipeline circuit is actively executing pipeline operations;
   wherein the sampled data other than sampled pipeline data is sampled from at least one second source of sampled data other than sampled pipeline data;
   wherein the at least one first source is different than the at least one second source.

8. The computer implemented method of claim 7 further comprising:

storing said sampled data other than sampled pipeline data.

9. The computer implemented method of claim 8 further comprising:
   providing said stored sampled data other than sampled pipeline data to an algorithm, which uses said sampled data other than sampled pipeline data to derive at least one performance characteristic of the pipeline.

10. The computer implemented method of claim 9 wherein said at least one performance characteristic cannot be inferred from said sampled pipeline data.

11. The computer implemented method of claim 9 wherein said at least one performance characteristic can be inferred from said sampled pipeline data.

12. The computer implemented method of claim 7 wherein:
   said sampled stage comprises a series of periodic predetermined sampling times; and
   said providing, by said sampling circuit, said sampled data other than sampled pipeline data occurs within said predetermined sampling times.

* * * * *